Patented Aug. 23, 1932

1,873,005

UNITED STATES PATENT OFFICE

SYLVAN R. MERLEY, OF DOVER, NEW JERSEY, ASSIGNOR TO DOHERTY RESEARCH COMPANY, OF NEW YORK, N. Y., A CORPORATION OF DELAWARE

PROCESS FOR DEHYDRATING ALCOHOLS AND OTHER ORGANIC COMPOUNDS

No Drawing.     Application filed May 23, 1928. Serial No. 280,119.

The present invention relates to a process for dehydrating alcohols and other organic compounds such as esters produced from petroleum hydrocarbons. The process is particularly adapted for the dehydration of the higher secondary and tertiary alcohols as well as the esters of such alcohols.

Since many of these organic compounds form constant boiling mixtures with water or, are very difficult to dehydrate because of being hygroscopic or because they decompose on distillation, they cannot be successfully treated by ordinary methods.

The primary object of the present invention is therefore, to efficiently remove the water from such compounds by a rapid and inexpensive process.

In accordance with this object the water is separated from the alcohols or other compounds by the use of a "third liquid" in a distilling operation, comparable to that disclosed in the German patent to Dr. Konrad Kubierschky issued in 1915, No. 287,897.

A further object of the invention is the provision of a process of dehydrating oxygen containing hydrocarbon compounds in which use is made of a "water carrier" liquid of abnormal water carrying power and which at the same time is very inexpensive.

In accordance with this feature of the process it is proposed to use a petroleum by-product, which heretofore has had practically no commercial value and which has a water carrying capacity many times that of previously known liquids such as benzol.

Various methods for dehydrating alcohols, particularly ethyl and propyl alcohol, have been proposed in which a third liquid such as benzol is added to an alcohol-water mixture and the final mixture subjected to distillation so that a ternary constant boiling mixture is formed and distills over at a lower temperature than the boiling point of the alcohol. Such processes are illustrated for example, by the German patent referred to above and the U. S. patent to Steffens No. 1,568,349.

The theory and practice upon which these processes proceed is that a ternary mixture must be formed and that the ternary mixture distilled over contains a higher ratio of water to alcohol than the original alcohol-water mixture.

One of the outstanding drawbacks to these processes however, is that the amount of alcohol carried over with the ternary mixture is so large compared to the water removed that the process is very inefficient and that the "third liquid" is expensive. Take for example the case of ethyl alcohol, 18.5% of the distillate is alcohol. In other cases large quantities of benzol must be vaporized in order to remove a comparatively small quantity of water.

While the process of the present invention may be carried out in apparatus similar to that shown in the patents referred to, it is preferred to operate on a comparatively large batch of mixed alcohols in a still equipped with a rectifying column. Such a mixture of alcohols is obtained by the hydrolysis of a mixture of alkyl sulfates, which in turn has been produced by reacting on petroleum products containing olefins, with concentrated sulfuric acid. This process of obtaining alcohols is well known and need not be described in detail. It is sufficient for present purposes to know that the wet alcohol mixture comprising the raw material for the present process comprises a mixture of alcohols such as isopropyl, isobutyl, secondary butyl, the amyl alcohols (secondary and tertiary), the hexyl alcohols and other higher secondary and tertiary alcohols. This crude mixture after distillation from the hydrolyzed material and before being subjected to the present treatment contains from 10 to 15% water.

The "water carrier" to be used in the process of dehydrating this mixture of alcohols is a polymer which can be obtained from, and which comprises a light fraction of what is commonly known in the industry as "66X". In the treatment of petroleum products containing olefins with 66° Bé. sulfuric acid for the production of alkyl sulfates considerable quantities of polymerized substances are formed which separate as a layer on the acid liquor. This mass of polymerized material is the polymer known as "66X", and is usually discarded as a waste product. The fraction of "66X" used in the present instance is a clear mobile liquid having a boiling temperature with water of from 50 to 70° C. A quantitative analysis of this fractional polymer product has not been made but from a qualitative analysis it is known to contain low boiling ketones (such as acetone), polymerized olefins (such as diisobutylene), light saturated hydrocarbons and sulphur derivatives of unknown composition.

The formation of this polymer product may be regarded as largely due to the polymerization of olefins along with some oxidation, the latter being evidenced by the formation of sulfur dioxide during the reaction. In some instances the polymers formed from olefins are called "dipolymers", "tripolymers", etc., as the case may be. The action of sulfuric acid on an olefin for the formation of polymers may be illustrated as follows:

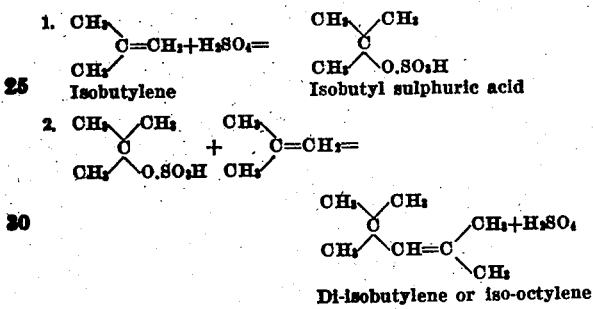

The di-isobutylene present in the polymer water carrier may also be formed during the hydrolysis of the acid alkyl sulphate liquor by the dehydrating action of sulphuric acid on tertiary butyl alcohol.

The process may be carried out as follows: To a charge of about 10,000 gallons of mixed wet alcohols in the still is added from 50 to 75 gallons of the polymer "water carrier" described above. The mass is heated by means of steam coils or other suitable means and the vapors subjected to rectification in the column so that the vapors of the polymer "water carrier" and water will be carried over from the column.

A condenser and separator are provided for condensing the polymer-water vapors and allowing the condensate to separate into two layers. The polymer is substantially immiscible with water and of lighter gravity, so that as it forms into a layer in the separator it is returned to the still to carry over additional quantities of water. It is preferred to return the polymer layer direct to the still, at least until practically all of the water has been removed from the alcohol mixture, since this obviates the necessity of such high temperature in the still. However, it may be desirable to introduce part of the return polymer into the column to control the temperature or provide reflux.

As long as there is any appreciable quantity of water in the alcohol mixture only a very small proportion of alcohol is carried over with the polymer and water; in fact, the first portions of the water separated are discarded as not containing alcohol sufficient to warrant its recovery. Even in the latter part of the distillation the most of the alcohol carried over and condensed is returned to the still or tower because of its solubility in the polymer layer. As long as there is any water in the mixture in the still two layers will be formed in the separator, so that as soon as the look box for the separator shows but a single layer of condensate the batch of alcohols is completely dehydrated.

The water having been separated from the alcohols the distillation is continued until substantially all of the polymers are driven over, condensed and conducted to storage to be used for a subsequent batch of alcohols. It will be noted that because of the relatively low boiling point of the polymer it is very readily separated from the alcohols; isopropyl the lowest of the series boiling at 82.3° C. In this separation there is no difficulty from the formation of binary or ternary constant boiling mixtures between the polymer and the alcohols as in the case of benzol. While the polymer may form a constant boiling mixture with the water in the water-alcohol mixture its carrying power may be explained by assuming that in distilling a mixture of alcohols and polymer, the polymer "steam" distils much more readily than the alcohols. In other words there is a selective steam distillation of the polymer in preference to that of the alcohols.

The polymer "water carrier" has a much greater water carrying power than has been noticed with any other compound. In some cases the amount of water carried over in the vapors has been as high as 50% while at other times the amount has been as low as 30%. These differences may be accounted for by the fact that a different polymer was used in the different instances; that is, the polymer used at one time was produced in a different sulfuric acid treatment than that used at another time.

In prior processes it has been necessary to carefully regulate the amount of the "third liquid" introduced into the distilling mixture in order to avoid contamination of the dehydrated alcohol, because the "third liquid" formed a constant boiling binary mixture with the alcohol. No such difficulty has been experienced in using the carrier liquid described above. In batch distillation it is of course desirable to eliminate the polymer along with the last traces of water so that only a small amount remains to be removed at the close of the dehydration step.

After the water and polymer have been removed from the alcohol mixture, the mixture of alcohols may be rectified in the usual way to separate out the various alcohols. This fractionation may be carried on in the still where the previous dehydration distillation has been carried on by merely passing each fraction from the separator to an individual receiver. It is preferred to fractionate the alcohol mixture after dehydration because a much better separation can be made due to the absence of the water which in some instances changes the boiling temperature of the components and appears to render the cuts less distinctive.

While the process has been described in connection with alcohols, particularly with a mixture of alcohols it is to be understood that the process is not to be limited to such treatment since it is equally applicable for the dehydration of individual alcohols, esters or other organic compounds. The process is especially useful in dehydrating mixed esters produced by the direct reaction between alkyl sulfates or halides and calcium acetate or other esterifying agent. Where mixed alkyl sulfates are produced from olefin containing materials they may be hydrolyzed to alcohols or treated directly with an esterifying agent to produce esters. In order to purify the mixed esters steam distillation is necessary and either before or after fractionation the esters must be dried. Where esters are dried by the above described process it is often unnecessary to make a clean separation of the "polymer" after the water has been removed, because esters are usually sold in the solvent trade as 85% esters. This "tolerance" of 15% may, therefore, be made up of "polymer" which in no way interferes with the solvent properties of the esters.

Having thus described the preferred embodiment of the invention what is claimed as new is:

1. The process of removing water from a mixture of aqueous alcohols, which comprises adding a light petroleum polymer liquid to said mixture, said polymer being of the type formed by the action of sulfuric acid on hydrocarbon material containing unsaturated hydrocarbons and substantially immiscible with water, distilling the resulting mixture to drive off the polymer and water, condensing the polymer-water vapors, separating the polymer from the water and constantly returning the polymer to the distilling zone until the water content of said alcohols is removed.

2. The process of removing water from a mixture of aqueous alcohols, which comprises subjecting such a mixture to distillation with a third liquid adapted to increase the ratio of water to alcohols in the vapors produced in said distillation, above their normal distilling ratio, said third liquid comprising a low boiling fraction of a polymer formed in the manufacture of alkyl sulfates from olefin material and sulfuric acid.

3. The process of producing dry alcohols from aqueous alcohols, which comprises mixing with the aqueous alcohol to be dried a lower boiling petroleum polymer liquid of the type formed by the action of sulfuric acid on hydrocarbon material containing unsaturated hydrocarbons, said polymer having a greater affinity for water than said alcohol, subjecting the mixture to distillation to drive over the water and added liquid and recovering the remaining dry alcohol.

4. In the process of dehydrating aqueous alcohols in which a third liquid miscible with the alcohol but substantially immiscible with water is added to the aqueous alcohol to be dehydrated and the mixture subjected to distillation to separate the third liquid and water from the alcohol, the improvement which comprises using as said third liquid a polymer produced in the treatment of olefin containing hydrocarbon material, with sulfuric acid and comprising a low boiling distillate having a boiling temperature of from 50° to 70° C.

5. In the process of dehydrating aqueous alcohols in which a third liquid miscible with the alcohol but substantially immiscible with water is added to the aqueous alcohol to be dehydrated and the mixture subjected to distillation to separate the third liquid and water from the alcohol, the improvement which comprises supplying for said third liquid a low boiling liquid mixture comprising saturated hydrocarbons and di-iso-butylene.

6. In the process of dehydrating aqueous alcohols in which a third liquid miscible with the alcohol but substantially immiscible with water is added to the aqueous alcohol to be dehydrated and the mixture subjected to distillation to separate the third liquid and water from the alcohol, the improvement which comprises adding a third liquid adapted to carry over in the distillation, water vapor equal to 30% of the total vapor, said liquid comprising a polymer formed from olefin containing hydrocarbon material.

7. The process of refining mixed aqueous alcohols, which comprises subjecting the aqueous alcohols to distilling conditions in the presence of a water stripping agent derived from polymerized olefin bearing materials, said agent being adapted to selectively remove water from said alcohols, distilling over and condensing the water and stripping agent, separating the agent from the water and returning it to the distilling zone, and after substantially all of the water is removed from said alcohols continuing the distillation to remove and separate the remaining portion of the stripping agent.

8. In the process of dehydrating aqueous organic compounds containing oxygen, such as alcohols and esters, in which a third liquid miscible with the organic compound but substantially immiscible with water is added to the aqueous compound to be dehydrated and the resulting mixture subjected to distillation to separate the third liquid and water from the organic compound, the improvement which comprises supplying for said third liquid an organic polymer mixture of the type formed by the action of sulfuric acid on hydrocarbon material containing unsaturated hydrocarbons.

In testimony whereof I affix my signature.

SYLVAN R. MERLEY.